Oct. 11, 1966  K. R. V. MAGNUSSON  3,278,226
WINTER CUSHION OF CELLULAR PLASTIC
Filed Oct. 23, 1964
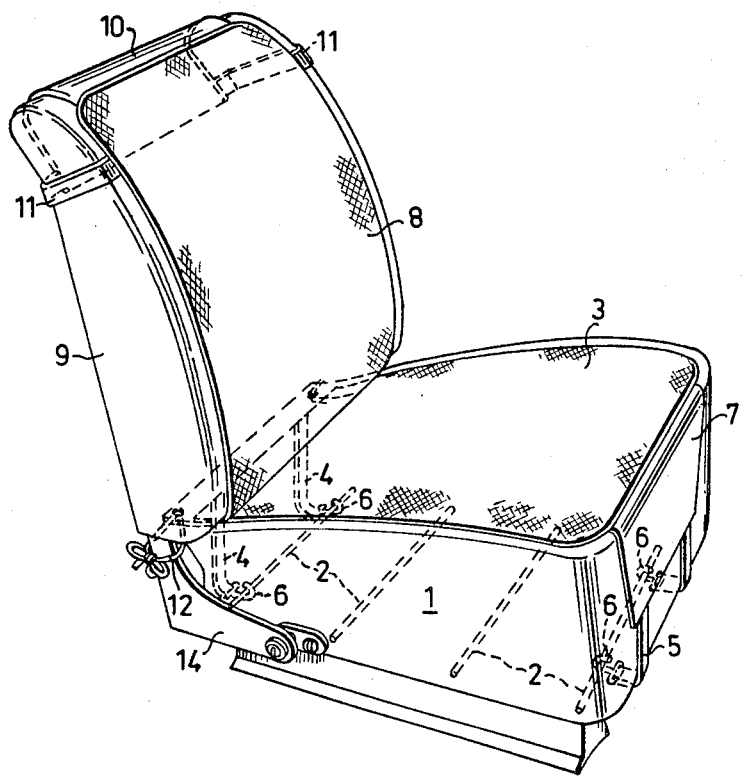
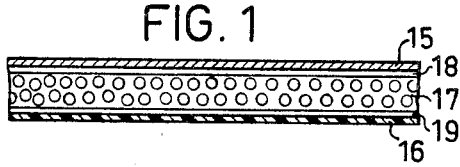
INVENTOR.
KARL R. V. MAGNUSSON
BY Young + Thompson
ATTYS.

United States Patent Office 3,278,226
Patented Oct. 11, 1966

3,278,226
WINTER CUSHION OF CELLULAR PLASTIC
Karl Rune Vincent Magnusson, Mariestad, Sweden, assignor to Fabriken Nike Aktiebolag, Mariestad, Sweden, a corporation of Sweden
Filed Oct. 23, 1964, Ser. No. 406,115
1 Claim. (Cl. 297—219)

This invention relates to a cushion adapted to be placed in winter on seats in motorcars and the like and comprising a heat-insulating material provided between external layers.

In its broadest aspect the invention is characterized in that one external layer consists of a tight and preferably also wear-resisting and insulating material, such as coated fabric, that the other external layer consists of a thin textile material of low heat-accumulating capacity, and that the intermediate layer consists of thin sheets of cellular plastic having a continuous skin on both sides. A cushion devised in this way is able on the one hand rapidly to reflect heat and consequently to reduce heat losses and on the other hand, to prevent or minimize absorption of moisture, resulting in that the cushion feels warm in use. The heat-preserving properties of the cushion are especially outstanding if the intermediate layer consists of a highly heat-insulating material, such as polystyrene. In contrast to prior-art foldable cushions, a cushion according to the invention need not be removed from the motorcar seat and stored in a warm room in order to be felt sufficiently warm when subsequently used again, but can be left in its place on the seat of the motorcar. Even after only a few seconds (after 10 seconds in case of a layer of cellular plastic of a thickness of about ⅓ of an inch) the cushion feels warm to the person who sits down on an initially cold cushion of this kind.

Due to the fact that the cushion may be left on the motorcar seat during the winter simple means may be used for retaining the cushion. To apply the cushion and retain it in correct position, it is advantageous if the cushion consists of two parts, a seat part and a back part, each of said parts comprising coherent sections. In such case, each part may be provided with bands or straps adapted to be passed on the underside of the motorcar seat and on the rear side of the seat back, respectively, to secure said parts in place.

Absorption of moisture by the layer of cellular plastic is prevented by the skin provided on both sides of this layer. Consequently, since the cushion can be kept substantially dry, its capacity of rapid warming is improved.

The bands or straps may be secured to opposite edges, preferably to the front and rear edges of the cushion and be provided at their ends with attaching members preferably in the form of hooks, at least some of the straps being elastic such that the attaching members are capable of being connected to bars or the like on the underside of the seat, the inherent resiliency of said seat being utilized to facilitate the attaching operation. Due to this arrangement the cushion can be attached for instance by means of hooks in a simple manner at least as regards the attaching members of one edge of the cushion by a person sitting down on the cushion thereby resiliently to compress the seat, whereupon the elastic straps are tensioned and can be conveniently connected to the bars or the like.

Upon subsequent release of the cushion the seat rebounds so that the cushion is kept in a tightened state and due to the tension and by means of the straps is moved to correct position in case it had been displaced or assumed an oblique position.

An example of the application of the invention is illustrated in the drawing in which FIG. 1 is a cross section on an enlarged scale of a part of the material from which the seat is manufactured, and FIG. 2 shows a perspective view of a motorcar seat with appertaining backrest and cushions mounted thereon.

The seat 1 proper is assumed to be of the conventional resilient type comprising a base and bars 2 or the like on the underside. The upper side is covered by a preferably heat-insulating seat cushion 3 which is retained by a pair of straps or bands 4 at the rear side and a pair of straps or bands 5 at the front side of the seat. The straps 4 and 5 may be sewn at one end to the cushion and are provided at the other end with attaching members in the form of hooks 6 which are connected to the nearest bars 2. The front straps 5 may either be directly sewn to the front edge of the cushion 3 or advantageously secured to a flap-like elongation or protective part 7 which is connected to the front edge of the cushion and extends along the front side of the seat when the cushion is placed in its position. All of the straps 4 and 5 may consist of elastic ribbons. Instead, the straps 4 or 5, preferably the rear straps, may be non-elastic whereas the front straps are elastic.

To apply the cushion described it is placed as far as possible in correct position on the seat of the car, whereupon the rear straps 4 are attached by hooking their hooks 6 on the rearmost bar 2. Thereupon the hooks 6 of the front straps 5 can be hooked on the front bar 2 after a person has sat down on the cushion so as to compress the seat. After compression of the seat the hooks 6 will assume suitable positions to be conveniently hooked on the bar. An especially effective attachment is obtained if at least the front straps 5 are elastic because, in this case, the cushion is elastically tightened even if it is heavily loaded. When the seat is unloaded the cushion is free and will be kept in correct position or pulled to correct position by the tensioned band in case it had been laterally displaced.

An additional cushion 8 may be provided for the backrest 9 of the seat. At its upper end this cushion may be kept in place by means of a flap 10 which is secured to the top edge of the backrest cushion and extends over the top edge of the backrest 9 downwards through some distance along the rear side of the backrest where lateral bands 11 connect the flap with the cushion 8. These bands may also be elastic. At its lower end the cushion 8 is retained by means of cords 12 or the like which are tied around some part 14 of the seat, or by means of elastic ribbons having their ends located such that the ribbons extend along the rear side of the backrest of the seat when the cushion is placed in its position.

The material of the cushion 3 consists of two external layers 15, 16 and an intermediate layer 17. The top layer 15 is a textile material of a woven type, the bottom layer consists of a coated fabric and the intermediate layer 17 of cellular artificial resin, such as polystyrene, having a continuous skin 18, 19 at both sides so that the cells are closed.

Cushions devised as described may be used on front seats as well as rear seats of motorcars and for other purposes.

What I claim is:

A cushion adapted to be placed in winter on seats in motorcars and the like, comprising a heat-insulating material provided between external layers, characterized in that the lower external layer is an impervious material such as coated fabric, the upper external layer is a textile material, and the intermediate layer is a thin flexible sheet of cellular synthetic resin that has a continuous skin on both sides and that conforms to the contour of the seat without substantially adding to the height of the seat and that has a thickness of about ⅓ inch.

References Cited by the Examiner

UNITED STATES PATENTS

| | | | |
|---|---|---|---|
| 1,209,586 | 12/1916 | Jensen | 5—355 |
| 1,551,452 | 8/1925 | Arias | 297—218 |
| 1,964,242 | 6/1934 | Behrle | 297—223 |
| 2,227,180 | 12/1940 | Falk | 297—223 |
| 2,616,486 | 11/1952 | Hawley | 5—361 |
| 2,791,268 | 5/1957 | Mendelsohn | 297—229 |
| 2,817,391 | 12/1957 | Zacks | 297—229 |
| 2,831,532 | 4/1958 | Kasper | 297—229 |
| 2,950,505 | 8/1960 | Frank | 264—45 XR |
| 3,032,916 | 5/1962 | Oakes | 297—219 |
| 3,043,627 | 7/1962 | Torjusen | 297—456 |

FOREIGN PATENTS

| | | |
|---|---|---|
| 868,887 | 5/1961 | Great Britain. |
| 929,026 | 6/1963 | Great Britain. |

FRANK B. SHERRY, *Primary Examiner.*

FRANCIS K. ZUGEL, *Examiner.*